(12) United States Patent
Morooka et al.

(10) Patent No.: US 7,985,360 B2
(45) Date of Patent: Jul. 26, 2011

(54) TEMPERATURE ADJUSTMENT METHOD FOR METAL MOLDS AND INJECTION MOLDING MACHINE

(75) Inventors: Masayoshi Morooka, Kariya (JP); Kaoru Okazoe, Anjo (JP); Hiroshi Hisano, Toyota (JP)

(73) Assignee: Denso Corporation, Kariya (JP)

( * ) Notice: Subject to any disclaimer, the term of this patent is extended or adjusted under 35 U.S.C. 154(b) by 488 days.

(21) Appl. No.: 11/714,248

(22) Filed: Mar. 6, 2007

(65) Prior Publication Data

US 2007/0284074 A1      Dec. 13, 2007

(30) Foreign Application Priority Data

Mar. 28, 2006    (JP) .................................. 2006-088432

(51) Int. Cl.
 *B29C 47/92*  (2006.01)
(52) U.S. Cl. ...................... 264/40.6; 264/40.1; 264/40.5; 264/234; 425/453
(58) Field of Classification Search .................. 264/40.1, 264/40.5, 40.6, 234; 425/453
See application file for complete search history.

(56) References Cited

U.S. PATENT DOCUMENTS

| | | | |
|---|---|---|---|
| 5,075,051 A | 12/1991 | Ito et al. | |
| 5,855,935 A * | 1/1999 | Brent et al. | 425/574 |
| 2005/0276875 A1* | 12/2005 | Lee | 425/144 |

FOREIGN PATENT DOCUMENTS

| | | |
|---|---|---|
| JP | A 58-173635 | 10/1983 |
| JP | A 3-207619 | 9/1991 |
| JP | A 5-124078 | 5/1993 |
| JP | A 5-329873 | 12/1993 |
| JP | A-5-337997 | 12/1993 |
| JP | A-7-47561 | 2/1995 |
| JP | A 9-141714 | 6/1997 |

OTHER PUBLICATIONS

Nov. 30, 2010 Office Action issued in Japanese Patent Application No. 2006-088432 (with translation).

* cited by examiner

*Primary Examiner* — Yogendra N Gupta
*Assistant Examiner* — John P Robitaille
(74) *Attorney, Agent, or Firm* — Oliff & Berridge, PLC

(57) ABSTRACT

An injection molding machine using a plurality of metal molds 2 and a plurality of stations S1 to S10, for executing molding by moving the metal molds in rotation and in one direction includes on one of the sides of the metal molds a plurality of heat pipes 5 which are fitted into the molds and one of the ends of which protrudes from the metal mold, and a heat transfer plate 6 so disposed as to cover a projection portion 5a of the heat pipe protruding from the metal mold. Temperature adjustment plates 4 connected to a temperature adjustment machine 4 are disposed on the other station side and while the metal mold is halted at the station, the temperature adjustment plates clamp the heat transfer plate and adjust the temperature of said metal mold.

4 Claims, 4 Drawing Sheets

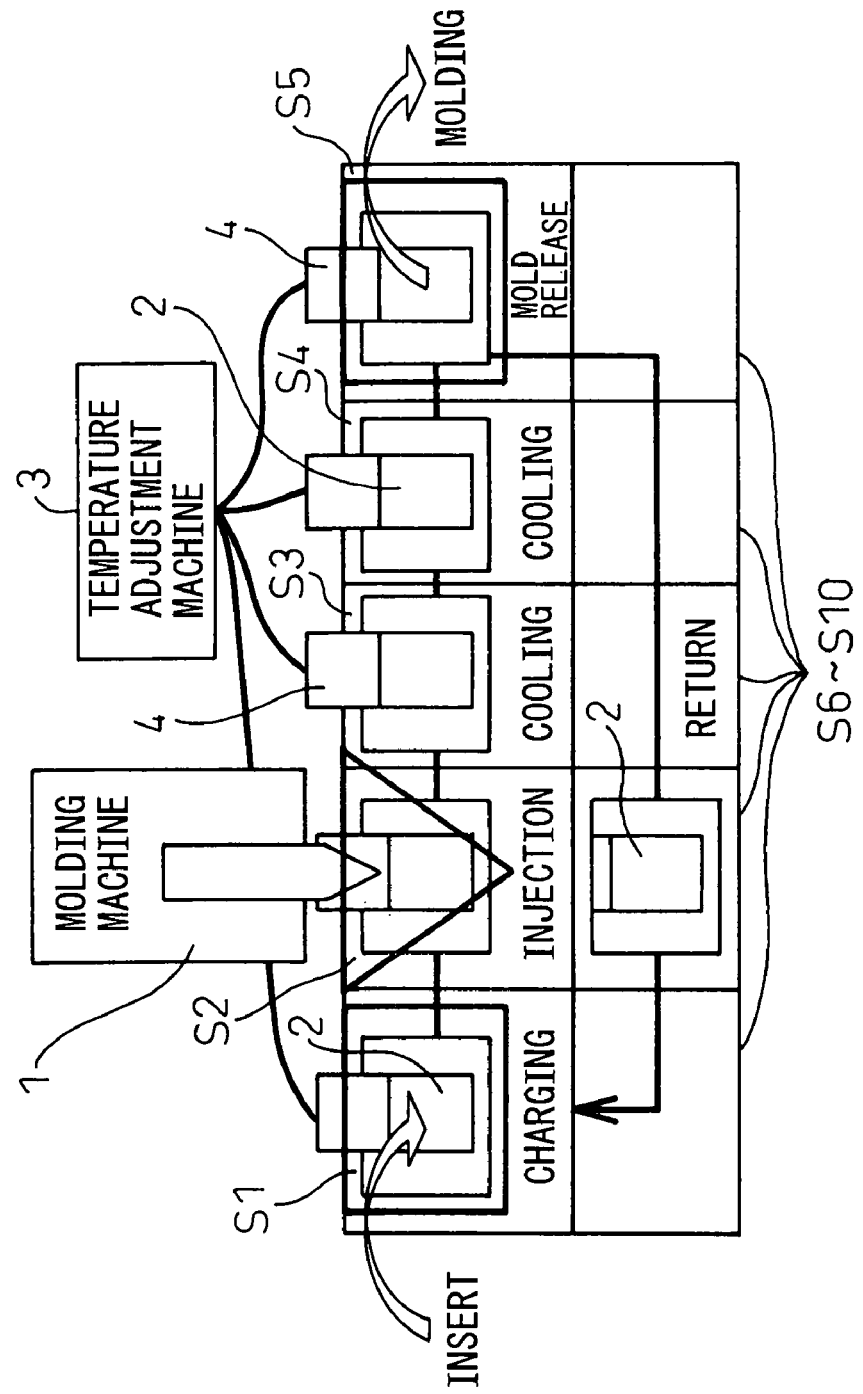

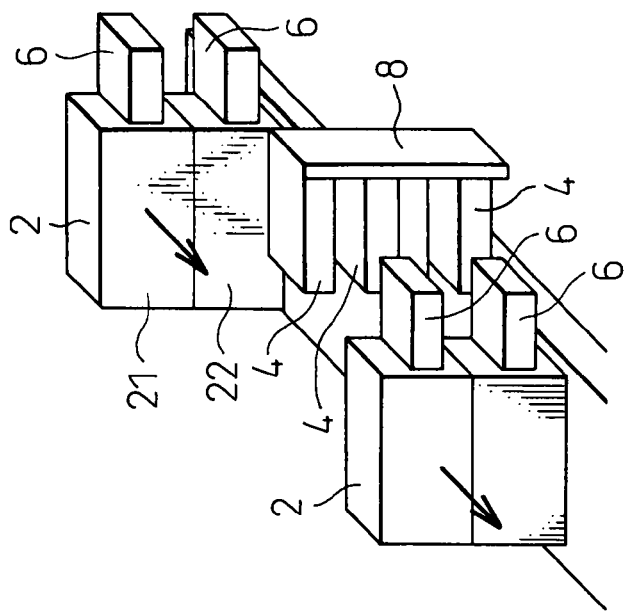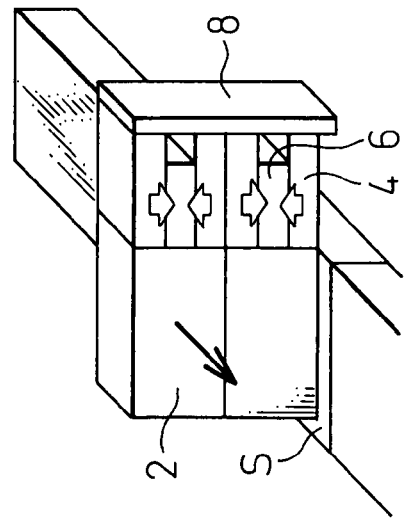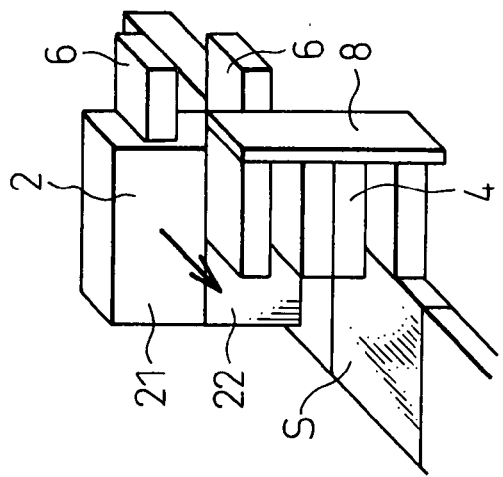

TEMPERATURE ADJUSTMENT METHOD FOR METAL MOLDS AND INJECTION MOLDING MACHINE

BACKGROUND OF THE INVENTION

1. Field of the Invention

This invention relates to a temperature adjustment method for metal molds in an injection molding system that prepares a plurality of movable metal molds, divides a series of a molding process such as mold clamping, injection, pressure retention, cooling, mold opening, mold release of a molding (and insert setting in the case of insert molding) and conducts in parallel the molding operations at a plurality of stations and serially conveys the metal molds. The invention also relates to an injection molding machine for this method.

2. Description of the Related Art

An injection molding system of the type which moves a plurality of metal molds in one direction such as a linear conveying system injection molding machine shown in FIG. 4 and a rotary table system injection molding machine shown in FIG. 5 have been proposed in the past by Japanese Unexamined Patent Publication No. 58-173635 and so on, for example.

Generally, in the injection molding system as mentioned above, in order to maintain a stable temperature of the mold, a method of cooling or heating a mold connected to pipes through which a cooling medium or a heating medium flows, and of heating a mold by means of a cartridge heater inserted into the mold and connected to electric wires are known, as proposed by Japanese Unexamined Patent Publication No. 3-207619, for example. That is, in Publication No. 3-207619, the cartridge heater or a thermocouple imbedded into the mold is connected to a control device, which is an electric source, via a rotary joint, and the temperature of the mold is controlled to the temperature required for resin molding.

However, because the metal molds are moved in rotation in one direction according to such prior art systems, connection by a rotary joint is indispensable to always keep a piping arrangement, for a cooling medium or a heating medium, connected, to the metal molds. The rotary joint has the problem of durability of a seal because it has a slide surface, and is therefore not free from the frequent occurrence of leakage of water.

When a cartridge heater or a thermo-couple is employed, electric power must be supplied through electric wires by using slide contacts such as slip rings. This method is not free from the problem of wear of brushes, either, and is not suitable at a mold temperature requiring cooling because temperature adjustment by heating solely depends on the heater.

Furthermore, these piping arrangements and electric wires get more complicated with the increase of the number of metal molds, and the number of metal molds that is used in practice is not greater than four.

SUMMARY OF THE INVENTION

In view of the problems described above, it is an object of the present invention to provide a temperature adjustment method of metal molds in an injection molding system for executing molding by using a plurality of stations and a plurality of metal molds by moving in rotation the metal molds in one direction, which method can stably keep the temperature of the metal molds by a simple method, is free from the troubles such as leakage of water of a rotary joint and a contact defect of a slip ring, and can achieve compact metal molds, and an injection molding machine for this temperature adjustment method.

According to one aspect of the invention, there is provided a method of adjusting temperatures of metal molds, wherein a heat transfer member for transferring heat is disposed at one of the ends of each metal mold 2, temperature adjustment plates 4, the temperature of which is adjusted by a temperature adjustment machine 3, are provided to predetermined ones of stations among stations, and when one of the ends of the heat transfer member comes into contact with the temperature adjustment plate 4 while the metal mold is halted at the predetermined one of the stations, heat exchange is executed and the temperature of the metal mold 2 is adjusted. Accordingly, even when the metal molds 2 are conveyed in rotation in one direction, it is not necessary to connect a coolant piping arrangement or electric wires for temperature adjustment to each metal mold 2, and handling of the metal mold becomes easy.

In the temperature adjustment method according to the invention, the heat transfer member comprises a plurality of heat pipes 5 each having a heat transfer plate 6 at one of the ends thereof, the heat pipe 5 is inserted into the metal mold 2 and heat exchange is executed as the heat transfer plate 6 is clamped by the temperature adjustment plates 4.

According to another aspect of the invention, there is provided an injection molding machine, wherein each metal mold 2 includes a plurality of heat pipes 5 fitted into the metal mold and having one of the ends thereof protruding from the metal mold and a heat transfer plate 6 so disposed as to cover a projection portion 5a of the heat pipe protruding from the metal mold, a predetermined one of stations on the station side is connected to a temperature adjustment machine 3, has temperature adjustment plates 4 capable of adjusting a temperature, and while the metal mold 2 is halted at the predetermined station, the temperature adjustment plates 4 clamp the heat transfer plate 6 and adjust the temperature of the metal mold 2. This injection molding machine is an apparatus invention of the method invention described above and can provide similar functions and effects as those of the method invention.

In the injection molding machine according to the invention described above, the heat transfer plate 6 and the temperature adjustment plate 4 are formed of a material having a high heat transfer rate. In consequence, heat exchange is executed more efficiently and heat transfer capacity can be improved.

In the injection molding machine according to the invention described above, a piping arrangement for causing a cooling medium to flow is disposed inside the temperature adjustment plate 4. In consequence, as the cooling medium is allowed to flow inside the piping arrangement, the temperature of the temperature adjustment plate 4 can be lowered, the metal mold 2 can be efficiently cooled and the cooling time of the metal mold 2 in the molding cycle can be shortened.

The present invention may be more fully understood from the description of preferred embodiments of the invention, as set forth below, together with the accompanying drawings.

BRIEF DESCRIPTION OF THE DRAWINGS

In the drawings:

FIG. 1 is an explanatory view useful for explaining a schematic overall construction of an injection molding machine according to an embodiment of the present invention;

FIGS. 3A, 3B and 3C are explanatory views for explaining a temperature adjustment plate installed at each station of the injection molding machine according to the invention and its mode of operation;

DESCRIPTION OF THE PREFERRED EMBODIMENT

Figure 2A:
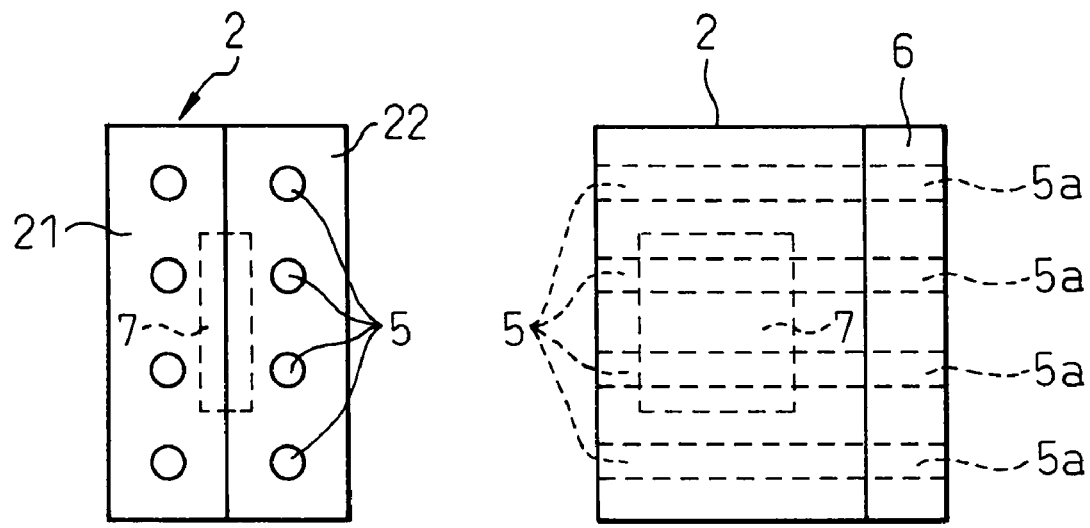
FIG. 2A is a plan view and a side view of a metal mold used for the injection molding machine according to the invention.

A temperature adjustment method of a metal mold and its injection molding machine according to the present invention will be hereinafter explained with reference to the accompanying drawings. FIG. 1 is a view showing a schematic overall construction of an injection molding machine according to an embodiment of the invention. The injection molding machine according to the invention uses a plurality of stations, and a plurality of metal molds 2, and carries out molding while the metal molds 2 are conveyed in rotation in one direction. This injection molding machine includes ten stations S1 to S10 that are arranged in two rows as shown in FIG. 1 and molding of a resin is conducted as each metal mold 2 moves between stations S1 to S10.

In other words, an insert is set into a cavity 7 inside the metal mold 2 at the charging station S1. The metal mold 2 is closed and is held under the mold clamp state. The molding machine 1 is connected to the metal molds 2 at the injection station S2 and a molten resin is charged into the cavity 7. Cooling of the resin charged by cooling of the metal molds 2 is carried out at the cooling stations S3 and S4. Next, release of mold clamping and mold opening of the metal mold 2 are carried out at the mold release station S5 and a resin molding is taken out from the metal mold 2. The metal mold 2 from which the molding is taken out is fed back to the original station S1 after it is conveyed through the stations S5 to S10. As such a molding cycle is repeated, molding is carried out. Incidentally, temperature adjustment plates 4 that constitute the feature of the present invention and are connected to the temperature adjusting machine 3 to be later described in detail are arranged at the stations S1 to S5, respectively.

Figure 2B:
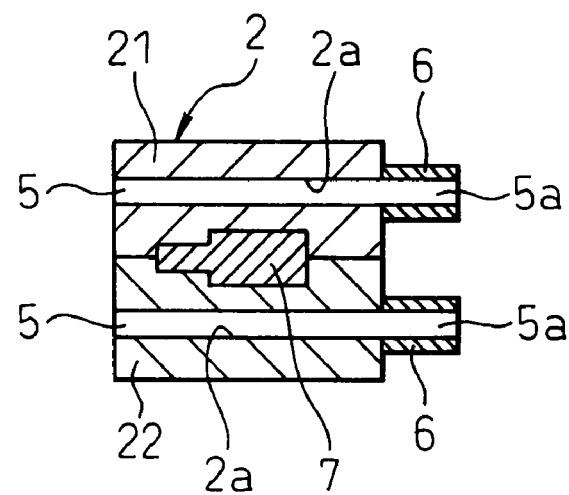
FIG. 2B is a sectional view of the metal mold shown in FIG. 2A.
Figure 4:
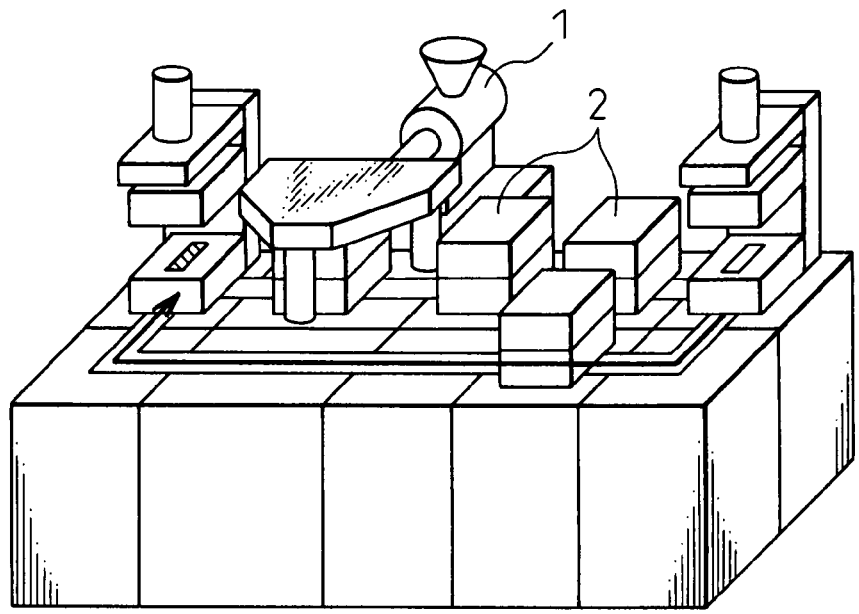
FIG. 4 is a perspective view showing a schematic overall construction of a linear carrying type injection molding machine according to the prior art.
Figure 5:
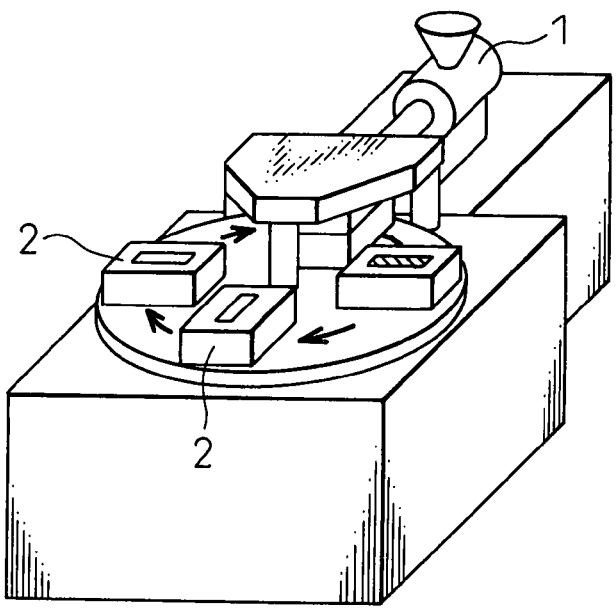
FIG. 5 is a perspective view showing a schematic overall construction of a rotary table type injection molding machine according to the prior art.

Next, the metal mold of the injection molding machine according to this embodiment shown in FIGS. 2A and 2B will be explained. The metal mold 2 includes an upper mold 21 and a lower mold 22, and the upper and lower molds 21 and 22 can be opened and closed by a mold opening/closing mechanism not shown in the drawings. A mold clamping/retaining mechanism for clamping the mold, an ejector mechanism for ejecting a molding from the mold, a slide core and its driving mechanism, all not shown in the drawings, are appropriately provided to the metal molds 2. An insert is appropriately arranged inside the cavity 7.

Through-holes 2a are bored in the metal mold 2 and several heat pipes 5 (4 for the upper mold 21 and 4 for the lower mold 22 in the embodiment shown in the drawings) are fitted in place of cooling water piping arrangements and cartridge heaters. One of the ends of each heat pipe 5 protrudes from the metal mold 2. A heat transfer plate 6 of a material having a high heat transfer rate (copper, for example) is disposed at the distal end of the projection portion 5a of each heat pipe 5. In this way, the heat transfer plate 6 and a plurality of heat pipes 5 together constitute a heat transfer member. In this case, it is possible to employ the construction in which two heat transfer plates 6 clamp from above and below the projection portion 5a and to bond them together, or a construction having a block shape in which the heat transfer plate 6 is provided with holes into which the projection portions 5a can be fitted. Incidentally, the heat transfer rate can be improved by arranging the heat pipes 5 as close as possible to the cavity 7. In this case, the response can be improved and, at the same time, the size of the metal mold 2 can be reduced.

On the other hand, the temperature adjustment plates 4 are provided to the stations S1 to S5 on the setup side as shown in FIGS. 3A to 3C. The temperature adjustment plate 4 is formed of a material having a high heat transfer rate (copper, for example), too. Two pairs of temperature adjustment plates 4 are arranged above and below in such a fashion that they can clamp the heat transfer plates 6 on the sides of the upper mold 21 and the lower mold 22 at the stop position of each station S1 to S5. Therefore, the temperature adjustment plates 4 of each set are supported movably by a support plate 8 so that they can come close to, and away from, each other. An opening/closing mechanism (reciprocation mechanism) of the temperature adjustment plates 4 of each set is not shown in the drawings but a known opening/closing mechanism such as an opening/closing mechanism that utilizes a link mechanism and an opening/closing mechanism that utilizes transverse screws and nuts can be used.

A piping arrangement (not shown) for causing water or oil as a cooling medium or a heating medium to flow is buried into each temperature adjustment plate 4 and is connected to a temperature adjustment machine 3 disposed outside. Therefore, when the temperature is controlled by cooling or heating the metal molds 2, the liquid such as water or oil adjusted to a desired temperature is allowed to flow inside the piping arrangement. Electric heating can be used, too, by disposing a cartridge inside the metal mold 2 when it is desired to heat only the metal mold 2.

Next, the operation of the temperature adjustment plates 4 will be explained with reference to FIGS. 3A, 3B and 3C. The temperature adjustment plate 4, the temperature of which is adjusted by the temperature adjustment machine 3, is installed at each station S1 to S5. Upper and lower two sets of temperature adjustment plates 4 are in the open state (mutually spaced-apart state) until the metal mold 2 is carried to the corresponding station as shown in FIG. 3A. When the metal mold 2 is carried and stops at each station S1 to S5, the upper and lower two sets of temperature adjustment plates 4 are closed (into the mutually approaching state) as shown in FIG. 3B and respectively clamp the heat transfer plate 6 of the upper mold 21 and the heat transfer plate 6 of the lower mold 22. In consequence, heat exchange is executed between the metal mold 2 and the temperature adjustment plate 4 and the temperature of the metal mold 2 is controlled. In other words, the heat of the molten resin packed into the cavity 7 is taken by the metal mold 2 during the cooling process at the stations S3 and S4 and this heat is transferred through the heat pipe 5 to the heat transfer plate 6 provided at the distal end of the heat pipe 5. The heat thus transferred to the heat transfer plate 6 is taken by the heat adjustment plate 4 and is radiated at the temperature adjustment machine 3, so that the temperature of the cavity 7 of the metal mold 2 is controlled. To heat the metal mold 2, heat is imparted to the metal mold 2 through the route reverse to the route described above.

The heat transfer plate 6 and the temperature adjustment plate 4 always keep the contact state during the stop of the metal mold 2. Consequently, the metal mold 2 can stably keep the mold temperature in association with the temperature set by the temperature adjustment machine 3. When the metal mold 2 moves to the next station, the upper and lower two sets of temperature adjustment plates 4 are opened, the heat transfer plate 6 is released from the clamping state and the metal mold 2 is carried to the next station as shown in FIG. 3C. In this way, the heat transfer plate 6 and the temperature adjustment plate 4 repeatedly come into contact with, and out of contact from, each other at each state S1 to S5, and the temperature of the metal mold 2 is thus controlled.

As explained above, the present invention makes it possible to render the metal mold compact, to reduce its heat capacity and to obtain an injection molding machine having high temperature controllability and a stable mold temperature by using heat pipes having high heat transfer capacity.

While the invention has been described by reference to a specific embodiment chosen for purposes of illustration, it should be apparent that numerous modifications could be made thereto by those skilled in the art without departing from the basic concept and scope of the invention.

The invention claimed is:

1. A method of adjusting temperatures of a plurality of metal molds traveling in rotation and in one direction toward a plurality of stations and executing molding, the method comprising:

selecting a predetermined station of said plurality of stations;

selecting a predetermined metal mold of said plurality of metal molds;

disposing a heat transfer member for transferring heat at an end of each of said plurality of metal molds;

providing a plurality of temperature adjustment plates at said predetermined station of said plurality of stations, movably supporting the plurality of temperature adjustment plates with a support plate, wherein at least one of the plurality of temperature adjustment plates moves close to and away from another at least one of the plurality of temperature adjustment plates;

adjusting a temperature of the temperature adjustment plates, with a temperature adjustment machine;

halting said predetermined metal mold at said predetermined station;

executing a heat exchange when an end of said heat transfer member comes into contact with a temperature adjustment plate while said predetermined metal mold is halted at said predetermined station;

adjusting the temperature of said predetermined metal mold during said heat exchange;

clamping a heat transfer plate with a plurality of the temperature adjustment plates, wherein said heat transfer member comprises a plurality of heat pipes, each of the plurality of heat pipes having the heat transfer plate at an end of the plurality of heat pipes, inserting a portion of the plurality of heat pipes at which said heat transfer plate is not disposed into said predetermined metal mold;

and executing the heat exchange as said heat transfer plate is clamped by said temperature adjustment plates, wherein each of the plurality of heat pipes is disposed in parallel to another of the plurality of the heat pipes and being disposed in a direction perpendicular to a conveying direction of the predetermined metal mold, the heat transfer plate and said temperature adjustment plates are formed of a material having a high heat transfer rate, the heat transfer plate is separate from the predetermined metal mold, the heat transfer plate covers one end of the heat pipe which protrudes from the predetermined metal mold, and the heat transfer plate is disposed on a side face of the predetermined metal mold.

2. An injection molding machine for executing molding by moving a plurality of metal molds in rotation and in one direction, comprising:

a plurality of metal molds that comprise:

a plurality of heat pipes fitted into each of the plurality of metal molds such that an end of each of the plurality of heat pipes protrude from the each of the plurality of metal molds; and a heat transfer plate that covers a projection portion of each of said plurality of heat pipes that protrude from each of the plurality of metal molds;

a plurality of stations; and a temperature adjustment machine that is connected to a predetermined one of said plurality of stations, the temperature adjustment machine having temperature adjustment plates capable of adjusting a temperature, the temperature adjustment plates being supported movably by a support plate, wherein at least one of the temperature adjustment plates moves close to and away from another at least one of the temperature adjustment plates, the heat transfer plate and said temperature adjustment plates are formed of a material having a high heat transfer rate, the heat transfer plate is separate from each of the plurality of metal molds, the heat transfer plate is disposed on a side face of each of the plurality of metal molds, and when a predetermined one of the plurality of metal molds is halted at said predetermined one of said plurality of stations, said temperature adjustment plates clamp said heat transfer plate and adjust the temperature of the predetermined one of the plurality of metal molds, each of the plurality of heat pipes being disposed in parallel another of the plurality of heat pipes and being disposed in a direction perpendicular to a conveying direction of the plurality of metal molds.

3. An injection molding machine according to claim 2, wherein a piping arrangement for causing a cooling medium to flow is disposed inside said temperature adjustment plates.

4. The method of claim 1, wherein the temperature adjustment machine is provided on each of the plurality of stations at which the predetermined metal mold is halted, except while the predetermined metal mold is being conveyed among the plurality of stations and is returned, and the temperature of the predetermined metal mold is adjusted.

* * * * *